(12) United States Patent
Chen et al.

(10) Patent No.: US 7,641,979 B2
(45) Date of Patent: *Jan. 5, 2010

(54) POLY(VINYL BUTYRAL) PELLETS

(75) Inventors: Wenjie Chen, Amherst, MA (US);
Andrew Neil Smith, East Longmeadow, MA (US); Aristotelis Karagiannis, Amherst, MA (US)

(73) Assignee: Solutia Inc., St. Louis, MO (US)

( * ) Notice: Subject to any disclaimer, the term of this patent is extended or adjusted under 35 U.S.C. 154(b) by 28 days.

This patent is subject to a terminal disclaimer.

(21) Appl. No.: 12/113,167

(22) Filed: Apr. 30, 2008

(65) Prior Publication Data

US 2008/0206574 A1    Aug. 28, 2008

Related U.S. Application Data

(63) Continuation of application No. 11/264,510, filed on Nov. 1, 2005.

(51) Int. Cl.
*B32B 17/10*     (2006.01)
*C08K 5/20*      (2006.01)
*C08L 61/00*     (2006.01)
*B29C 47/02*     (2006.01)

(52) U.S. Cl. .............. 428/441; 264/211; 524/877; 524/186

(58) Field of Classification Search ............ 524/186, 524/877; 428/441; 264/211
See application file for complete search history.

(56) References Cited

U.S. PATENT DOCUMENTS

| | | | |
|---|---|---|---|
| 2,423,981 A | 7/1947 | Kaltreider | |
| 4,226,818 A | 10/1980 | Brower | |
| 4,287,107 A | 9/1981 | Hermann | |
| 4,386,125 A * | 5/1983 | Shiraki et al. ............. | 428/35.1 |
| 4,751,266 A | 6/1988 | Hermann | |
| 4,968,745 A | 11/1990 | Misra | |
| 4,999,078 A | 3/1991 | Misra | |
| 4,999,253 A | 3/1991 | Misra | |
| 5,030,688 A | 7/1991 | Misra | |
| 5,130,370 A * | 7/1992 | Udipi et al. ................ | 525/57 |
| 5,246,764 A | 9/1993 | LaPorte | |
| 5,399,401 A | 3/1995 | Powell | |
| 5,478,412 A | 12/1995 | Simon | |
| 5,547,736 A | 8/1996 | Simon | |
| 5,594,069 A | 1/1997 | David | |
| 5,595,818 A | 1/1997 | Hopfe | |
| 5,618,863 A | 4/1997 | D'Errico | |
| 5,728,472 A | 3/1998 | D'Errico | |
| 5,773,102 A | 6/1998 | Rehfeld | |
| 6,093,471 A | 7/2000 | Hopfe | |
| 6,346,599 B1 * | 2/2002 | Goldberg et al. ........... | 528/354 |
| 6,372,352 B1 | 4/2002 | Bletsos | |
| 6,521,306 B1 * | 2/2003 | Hoenig et al. .............. | 428/36.8 |
| 6,825,255 B2 | 11/2004 | Yuan | |
| 6,835,269 B1 * | 12/2004 | Miharu et al. ........... | 156/244.11 |
| 6,958,371 B1 * | 10/2005 | Wang et al. ................ | 525/58 |
| 7,041,375 B2 * | 5/2006 | Chen ....................... | 428/423.1 |
| 7,060,358 B2 * | 6/2006 | Chen ....................... | 428/425.6 |
| 7,125,921 B2 * | 10/2006 | Yuan et al. ................. | 524/230 |
| 7,491,761 B2 * | 2/2009 | Chen et al. ................. | 524/186 |
| 2004/0087706 A1 * | 5/2004 | Fish et al. .................. | 524/494 |
| 2004/0266931 A1 * | 12/2004 | Lee et al. ................... | 524/435 |
| 2005/0032950 A1 | 2/2005 | Lee et al. | |
| 2005/0137303 A1 * | 6/2005 | Shelby et al. .............. | 524/284 |
| 2006/0008653 A1 * | 1/2006 | Chen ....................... | 428/423.1 |

FOREIGN PATENT DOCUMENTS

| DE | 100 64 373 A 1 | 6/2002 |
|---|---|---|
| WO | WO 02/12356 | 2/2002 |
| WO | WO 2004/111115 A | 12/2004 |

* cited by examiner

*Primary Examiner*—Mark Eashoo
*Assistant Examiner*—Noah Frank
(74) *Attorney, Agent, or Firm*—Hamilton, Brook, Smith & Reynolds, P.C.

(57) ABSTRACT

The present invention is in the field of thermoplastic polymeric compositions, and, specifically, the present invention is in the field of poly(vinyl butyral) formation, storage, and use in multiple layer glazing panel interlayers, among other uses.

22 Claims, No Drawings

POLY(VINYL BUTYRAL) PELLETS

CROSS-REFERENCE TO RELATED APPLICATIONS

This application claims priority to and is a continuation of U.S. application Ser. No. 11/264,510 filed on Nov. 1, 2005, which is hereby incorporated by reference in its entirety.

FIELD OF THE INVENTION

The present invention is in the field of thermoplastic polymeric compositions, and, specifically, the present invention is in the field of poly(vinyl butyral) formation, storage, and use in multiple layer glazing panel interlayers, among other uses.

BACKGROUND

Poly(vinyl butyral) (PVB) is commonly used in the manufacture of polymer sheets that can be used as interlayers in light-transmitting laminates such as safety glass or polymeric laminates. Safety glass often refers to a transparent laminate comprising a poly(vinyl butyral) sheet disposed between two sheets of glass. Safety glass often is used to provide a transparent barrier in architectural and automotive openings. Its main function is to absorb energy, such as that caused by a blow from an object, without allowing penetration through the opening or the dispersion of shards of glass, thus minimizing damage or injury to the objects or persons within an enclosed area.

Plasticized poly(vinyl butyral), whether in sheet or pellet form, inherently tends to stick to itself during storage or transportation. The strength of the self-adhesion of plasticized poly(vinyl butyral) can reach such levels that it is impossible to separate if the sheets or pellets were not refrigerated. This kind of severe self-adhesion is referred to as 'blocking' in the art of poly(vinyl butyral) manufacture. The nature of blocking creates great difficulties in the sheet handling during manufacture, transportation, and the lamination process. It also makes it extremely difficult to feed poly(vinyl butyral) pellets continuously into an extruder. Although many attempts have been made to ameliorate or eliminate blocking in poly(vinyl butyral), few have been successful at producing a poly(vinyl butyral) that both resists blocking and provides a poly(vinyl butyral) with the desired physical and optical characteristics (see, for example, WO 02/12356).

The continuous feeding of plasticized poly(vinyl butyral) pellets during extrusion, compounding, blending, or molding would offer significant advantages and convenience in terms of processing and cost. Accordingly, further improved compositions and methods are needed to enhance the manageability of poly(vinyl butyral) pellets without detrimentally affecting optical qualities and without requiring cumbersome refrigeration.

SUMMARY OF THE INVENTION

The present invention provides plasticized poly(vinyl butyral) having incorporated therein or thereon an antiblocking agent, and in some embodiments a fatty acid amide composition, that allows the facile production, storage, and handling of a pelleted form of the polymer. The pellets thus produced can advantageously be used to form many objects and materials, including, for example, multiple layer glazing interlayers.

DETAILED DESCRIPTION

The present invention provides a poly(vinyl butyral) pellet that resists blocking through the incorporation of surprisingly effective antiblocking agents.

Pellets of the present invention incorporate an antiblocking agent, and in preferred embodiments a fatty acid amide, as will be described in detail below, with the thermoplastic polymer poly(vinyl butyral), for which various possible compositions are described in detail below.

Pellets of the present invention are useful in any processing methods utilizing poly(vinyl butyral), for example, and without limitation, for extrusion, molding, blending, or compounding, among others. Pellets can be formed by any suitable method, and the antiblocking agents can be incorporated with the poly(vinyl butyral) as detailed below. Pellets can be formed, for example and without limitation, by pelletizing, strand cutting, dicing, granulating, or pulverizing. In various embodiments, pellets are formed by pelletizing.

Pellets of the present invention can be any suitable shape and size, depending on the given application. In various embodiments of the present invention, pellets can be at least 1 milligram, at least 10 milligrams, at least 100 milligrams, at least 1 gram, or at least 5 grams. Pellets having lower or higher masses are also within the scope of the present invention. In various embodiments, pellets of the present invention are between 0.1 and 100 milligrams, 3 and 20 milligrams, or 5 and 20 milligrams.

In various embodiments of the present invention, pellets can be less than 3 centimeters, less than 2 centimeters, less than 1 centimeter, or less than 0.5 centimeters across the greatest dimension. In various embodiments pellets can be from 1-5 millimeters across the greatest dimension. Pellet shape can be any conventionally used pellet shape, for example, spherical, ovate, rectilinear, cylindrical, cubic, and the like, as well as irregular shapes.

In other embodiments, pellets of the present invention are micropellets having a greatest dimension as small as 10 micrometers and a mass as small as 4 nanograms.

Mixtures of pellets of different dimensions, as given above, are also within the scope of the present invention.

The present invention includes batches of pellets, for example batches having more than 1, more than 100, more than 1,000, or more than 10,000 pellets. The present invention also includes containers containing pellets of the present invention, including containers containing, more than 1, more than 100, more than 1,000, or more than 10,000 pellets.

Antiblocking Agents

Antiblocking agents of the present invention that are incorporated into or onto pellets can be any suitable antiblocking agent, as is known in the art, including those described in this section, and the preferred amide antiblocking agent described elsewhere herein.

Antiblocking agents useful with the pellets of the present invention can be added in the appropriate amount to a polymer melt prior to formation of the pellets, and can be included, for example at up to 2%, 1.5%, 1%, 0.5% or 0.1% of the melt, on a weight per weight basis.

Useful antiblocking agents also include, but are not limited to, bifunctional surface modifying agents that comprise an anti-blocking segment and a compatibility segment. Exemplary embodiments of modifying agents include alkylbenzenesulfonates ($RC_6H_4SO_3M$), alkylsulfonates ($RSO_3M$), alky sulfates ($ROSO_3M$), alkylcarboxylates (RCOOM), polyalkoxycarboxylates ($R(OCH_2CH_2)_nOCH_2COOM$), and alkylphosphate esters ($ROPO_3M_2$); where M is hydrogen or a metal cation (e.g., sodium, potassium, magnesium, calcium, and the like) or an ammonium ion, R is an alkyl group, and n, the number of repeat unit, is >1.

A second type of bifunctional surface modifying agent that is useful as an antiblocking agent comprises an anti-blocking segment and a compatibility segment. The anti-blocking segment preferably comprises a polyethylene block or hydrocarbon chain block and the compatibility segment preferably comprises a poly(alkylene glycol) block.

In further embodiments, a fluorinated compound can be added to a pellet to provide antiblocking properties. In yet further embodiments, antiblocking agents that are known in the art can be used, for example, as disclosed in the following German Patent Documents DE2846837, DE3429440, DE10064373, International Patent Document WO03051974, Japanese Patent Documents JP53102380, JP53024369, JP58052304, JP08188660, JP11217245 and U.S. Pat. No. 6,323,159.

In addition to incorporating antiblocking agents into the bulk in a melt, anti-blocking agents can also be disposed on the pellet surface by various conventional coating technologies, including, but not limited to, spray techniques, electrostatic technology, immersion (dipping) techniques, and the like. In the spray coating process, the agent is disposed in a liquid carrier, atomized, and projected at the surface of the pellet. The carrier may be aqueous, or solvent-based (e.g., organic oxygen containing solvents). The concentration of the anti-block agent in the carrier should be sufficient to achieve the desired performances. In general, the agent is disposed in the liquid carrier preferably at a concentration of 0.1 to 15% by weight; more preferably 0.5 to 10%; most preferably 1 to 5%. In the dipping process, the pellets are immersed in a dispersion carrying the anti-block agent. Once the agent is deposited on the pellets, the carrier can be volatilized off, thereby leaving the anti-block agent on the surface of the pellet.

In addition to the individual antiblocking agents provided above, mixtures of two or more antiblocking agents can also be used.

Fatty Acid Amide Antiblocking Agent

Fatty acid amides are well known as an important class of polymer additives used as a slip agent or lubricant to prevent unwanted adhesion. Unfortunately, however, the addition of such amides for the purpose of antiblock additives for polymer sheets, as defined below, in glass laminates (reduction of unwanted adhesion between surfaces of the polymer sheet itself) has been found to adversely affect the optical characteristics of the polymer sheet, such as haze, transparency, and film clarity, as well as adhesion of the polymer sheet to glass. Accordingly, the use of fatty acid amides for such uses as polymer sheet interlayers in glass laminates appeared to have been precluded.

Unexpectedly, however, it has been discovered that a fatty acid amide can be successfully used as an antiblocking agent in polymer sheet while not affecting optical properties of the polymer sheet or the adhesive properties of the polymer sheet to glass (see U.S. Pat. No. 6,825,255) or other rigid substrates. According to the present invention, it has been discovered that a fatty acid amide can be effectively used to prevent blocking in pellets of poly(vinyl butyral) without also negatively impacting the final poly(vinyl butyral) product.

The fatty acid amides of the present invention preferably are amides with the general formula:

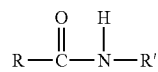

wherein R defines an anti-blocking segment comprising a hydrocarbon chain having about 12 to about 40 carbon atoms, and R' defines H or a hydrocarbon chain having 1 to about 40 carbon atoms. These amides include erucamide, behenamide, oleyl palmitamide, stearyl erucamide, erucyl stearamide, hydroxystearamide, oleic acid diethanolamide, stearic acid diethanolamide, poly(ethylene glycol) oleic amide, octadecanamide (hereinafter "stearamide"), and mixtures of the foregoing amides. Mono-amides are preferred. Secondary mono-amides particularly are preferred. A particularly preferred secondary mono-amide is N-oleyl palmitamide, an amide with a double bond geometry as shown:

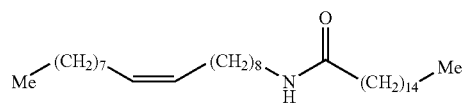

The method of incorporating the amide antiblock agent with the poly(vinyl butyral) pellets to impart the desired properties to the surface of the poly(vinyl butyral) pellets is not critical. Preferably, the amide antiblock agent can be added into the melt prior to formation of the pellets. The agent is provided in the melt at a concentration sufficient to provide the desired antiblocking character to the pellets without unnecessarily affecting clarity and glass adhesion of any finished poly(vinyl butyral) product.

Preferably the amide is incorporated with the plasticized poly(vinyl butyral) pellets at a concentration of about 0.001 to about 2.0 wt %, 0.001 to about 6.0 wt %; more preferably about 0.01 to about 0.6 wt %; most preferably about 0.1 to about 0.3 wt %. A poly(vinyl butyral) sheet made from pellets of the present invention, in various embodiments, has a blocking force of at least about 50%, more preferably at least about 70%, and most preferably at least about 90% less than the blocking force of a polymer sheet comprising poly(vinyl butyral) without the amide antiblock agent.

The amide antiblock agent can also be incorporated onto the pellet surface by various coating technologies, including, but not limited to, those described elsewhere herein.

The glass adhesion of a poly(vinyl butyral) sheet produced from pellets of the present invention is substantially unaffected by the presence of the amide antiblock agent. Preferably, the adhesion value (quantification of the tendency of the poly(vinyl butyral) sheet to adhere to glass) is within about 20%, more preferably within about 10%, most preferably within about 5% of the adhesion value of a poly(vinyl butyral) sheet without antiblock agent. The adhesion to glass may be measured by any one or a combination of techniques including, but not limited to, peel tests and pummel adhesion tests.

Poly(Vinyl Butyral)

The following section describes the various poly(vinyl butyral) compositions that can be used to form pellets of the present invention.

As used herein, a "polymer sheet" means any thermoplastic polymer composition formed by any suitable method into a thin layer that is suitable alone, or in stacks of more than one layer, for use as an interlayer that provides adequate penetration resistance and glass retention properties to laminated glazing panels. Plasticized poly(vinyl butyral) is most commonly used to form polymer sheets.

As used herein, "resin" refers to the polymeric (for example poly(vinyl butyral)) component that is removed from the mixture that results from the acid catalysis and subsequent neutralization of the polymeric precursors. Resin will generally have other components in addition to the polymer, such as acetates, salts, and alcohols. As used herein, "melt" refers to a melted mixture of resin with a plasticizer and optionally other additives.

In any of the embodiments of the present invention given herein that comprise poly(vinyl butyral) as the polymeric component of the pellets, another embodiment is included in which the polymer component consists of or consists essentially of poly(vinyl butyral). In these embodiments, any of the variations in additives, including plasticizers, disclosed herein can be used with the poly(vinyl butyral) having a polymer consisting of or consisting essentially of poly(vinyl butyral).

Poly(vinyl butyral) resins of the present invention can be produced using any conventionally known methods. Details of suitable processes for making poly(vinyl butyral) are known to those skilled in the art (see, for example, U.S. Pat. Nos. 2,282,057 and 2,282,026). In one embodiment, the solvent method described in Vinyl Acetal Polymers, in Encyclopedia of Polymer Science & Technology, $3^{rd}$ edition, Volume 8, pages 381-399, by B. E. Wade (2003) can be used. In another embodiment, the aqueous method described therein can be used. Poly(vinyl butyral) is commercially available in various forms from, for example, Solutia Inc., St. Louis, Mo. as Butvar™ resin.

In various embodiments, poly(vinyl butyral) resin comprises 10 to 35 weight percent (wt. %) hydroxyl groups calculated as poly(vinyl alcohol), 13 to 30 wt. % hydroxyl groups calculated as poly(vinyl alcohol), or 15 to 22 wt. % hydroxyl groups calculated as poly(vinyl alcohol). The poly (vinyl butyral) resin can also comprise less than 15 wt. % residual ester groups, 13 wt. %, 11 wt. %, 9 wt. %, 7 wt. %, 5 wt. %, or less than 3 wt. % residual ester groups calculated as poly(vinyl acetate), with the balance being an acetal, preferably butyraldehyde acetal, but optionally including other acetal groups in a minor amount, e.g., a 2-ethyl hexanal group (see, for example, U.S. Pat. No. 5,137,954).

In various embodiments poly(vinyl butyral) can have a molecular weight of at least 30,000, 40,000, 50,000, 55,000, 60,000, 65,000, 70,000, 120,000, 250,000, or at least 350,000 grams per mole (g/mole or Daltons). Small quantities of a dialdehyde or trialdehyde can also be added during the acetalization step to increase molecular weight to at least 350 g/mole (see, for example, U.S. Pat. Nos. 4,902,464; 4,874, 814; 4,814,529; and, 4,654,179). As used herein, the term "molecular weight" means the weight average molecular weight.

Various adhesion control agents can be added to the poly (vinyl butyral) of the present invention, including sodium acetate, potassium acetate, and magnesium salts. Magnesium salts that can be used with these embodiments of the present invention include, but are not limited to, those disclosed in U.S. Pat. No. 5,728,472, such as magnesium salicylate, magnesium nicotinate, magnesium di-(2-aminobenzoate), magnesium di-(3-hydroxy-2-napthoate), and magnesium bis(2-ethyl butyrate) (chemical abstracts number 79992-76-0). In various embodiments of the present invention the magnesium salt is magnesium bis(2-ethyl butyrate).

Other additives may be incorporated into the poly(vinyl butyral) to enhance its performance in a final product. Such additives include, but are not limited to, dyes, pigments, stabilizers (e.g., ultraviolet stabilizers), antioxidants, IR absorbers, flame retardants, combinations of the foregoing additives, and the like, as are known in the art.

Any suitable plasticizers can be added to the poly(vinyl butyral) resins of the present invention in order to form poly (vinyl butyral) melts that can be formed into pellets. Plasticizers used in the poly(vinyl butyral) melts of the present invention can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779 and $C_6$ to $C_8$ adipate esters, such as hexyl adipate. In various embodiments, the plasticizer used is dihexyl adipate and/or triethylene glycol di-2 ethylhexanoate.

In various embodiments of polymer sheets of the present invention, poly(vinyl butyral) can comprise 20 to 60, 25 to 60, 20 to 80, 10 to 70, or 10 to 100 parts plasticizer per one hundred parts of resin (phr). Of course other quantities can be used as is appropriate for the particular application. In some embodiments, the plasticizer has a hydrocarbon segment of fewer than 20, fewer than 15, fewer than 12, or fewer than 10 carbon atoms.

The amount of plasticizer can be adjusted to affect the glass transition temperature ($T_g$) of the poly(vinyl butyral) product. In general, higher amounts of plasticizer are added to decrease the $T_g$. Poly(vinyl butyral) polymer sheets of the present invention, for example, can have a $T_g$ of 40° C. or less, 35° C. or less, 30° C. or less, 25° C. or less, 20° C. or less, and 15° C. or less.

Any suitable method can be used to produce polymer sheets of the present invention from pellets of the present invention. The poly(vinyl butyral) pellets comprising poly (vinyl butyral) resin, plasticizer, and any additives can be thermally processed and configured into sheet form according to methods known to those of ordinary skill in the art. One exemplary method of forming a poly(vinyl butyral) sheet comprises extruding molten poly(vinyl butyral) pellets comprising resin, plasticizer, and additives by forcing the melt through a die (for example, a die having an opening that is substantially greater in one dimension than in a perpendicular dimension). Another exemplary method of forming a poly (vinyl butyral) sheet comprises casting a melt from a die onto a roller, solidifying the resin, and subsequently removing the solidified resin as a sheet. In various embodiments, the polymer sheets can have thicknesses of, for example, 0.1 to 2.5 millimeters, 0.2 to 2.0 millimeters, 0.25 to 1.75 millimeters, and 0.3 to 1.5 millimeters.

Pellets of the present invention can be used to produce products other than safety glass interlayers that use poly (vinyl butyral), such as electronic components, such as photolithographic technologies and photovoltaic cells, among others, without limitation.

The present invention includes multiple layer glazing interlayers, polymeric layers, and other devices comprising poly (vinyl butyral), wherein the interlayers, polymeric layer, or other devices are made directly or indirectly from pellets of the present invention.

The present invention includes poly(vinyl butyral) pellets formulated as described herein that comprise a dye, pigment, or other colorant. These embodiments are particularly useful to form poly(vinyl butyral) products having various coloration. For example, poly(vinyl butyral) pellets can be supplied in a pallet of colors that can be mixed in differing ratios to form a particular product.

The present invention includes methods of preventing blocking in poly(vinyl butyral) pellets, comprising adding a fatty acid amide of the present invention to poly(vinyl butyral) compositions of the present invention to form pellets.

The present invention includes methods of manufacturing multiple layer glazing interlayers, polymeric layers, and other devices, comprising the steps of providing pellets of the present invention, heating the pellets until they form a melt, and then using the melt to form the interlayers, polymeric layers, or other devices.

The present invention includes bilayer applications, in which one or more polymer layers are disposed on a single rigid substrate, such as glass, wherein the bilayer interlayer is formed from pellets of the present invention and/or according to a method of the present invention. A typical bilayer application, for example and without limitation, has the following construction: glass//poly(vinyl butyral) layer//poly(ethylene terephthalate) layer, which is useful in applications in which a thinner, lighter laminated panel is desirable.

Various polymer sheet and/or laminated glass characteristics and measuring techniques will now be described for use with the present invention.

The clarity of a polymer sheet can be determined by measuring the haze value, which is a quantification of the scattered light by a sample in contrast to the incident light. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments of the present invention, percent haze is less than 5%, less than 3%, and less than 1%.

Blocking can be measured according to the following technique, and, as used and referred to herein, "blocking force" is determined using the following technique, which is a measure of "peel adhesion." Two rectangular filmstrips are cut and placed together in completely overlapping pairs. The top sheet of each pair is adhered to a piece of tape of a corresponding size. The film pairs are placed centrally between two steel plates and the assembly is subjected to 69 kilo Pascal pressure at a temperature range of about 7° C.-25° C. for 24 hours. The strips can then be peeled apart in a 90-degree peel test by a peel testing apparatus at a peel speed of 84 inches per minute. The blocking force is quantified in pounds per linear inch (PLI).

In various embodiments, fatty acid amide antiblocking agents of the present invention are incorporated into pellets used to form polymer sheets at a concentration sufficient to impart a blocking force of less than 2.5 pounds per linear foot (PLI), less than 2.25 PLI, less than 2.0 PLI, less than 1.75, PLI, less than 1.5 PLI, less than 1.25 PLI, less than 1.0 PLI, less than 0.8 PLI, less than 0.6 PLI, less than 0.5 PLI, less than 0.4 PLI, less than 0.3 PLI, less than 0.2 PLI, and less than 0.1 PLI. One of ordinary skill in the art, based upon the teachings of the disclosure, will readily be able to alter the production conditions given herein in order to produce polymer sheets of the present invention with the desired blocking force.

EXAMPLE 1

The following components are mixed to form a melt: 100 parts poly(vinyl butyral) resin having between 17 and 19 weight percent residual hydroxyl content measured as poly (vinyl alcohol), 38 parts tri(ethylene glycol) bis(2-ethylhexanoate), 0.3 parts oleyl palmitamide, and other additives. The melt is extrusion pelletized into uniform spherical pellets with a diameter of about 3 millimeters. The resulting pellets show little sticking immediately after manufacture, are easily separated, do not block, and are free flowing after six months of storage at room temperature.

EXAMPLE 2

The following components are mixed to form a melt: 100 parts poly(vinyl butyral) resin having between 17 and 19 weight percent residual hydroxyl content measured as poly (vinyl alcohol), 38 parts tri(ethylene glycol) bis(2-ethylhexanoate), and other additives. The melt is extrusion pelletized into uniform spherical pellets with a diameter of about 3 millimeters. The resulting pellets immediately form an agglomerate after manufacture, and are blocked after one week of storage at room temperature.

By virtue of the present invention, it is now possible to provide pellets of poly(vinyl butyral) that resist blocking and that advantageously allow for the facile and inexpensive processing of poly(vinyl butyral) in pellet form.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, and that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout. For example, a pellet can be formed comprising poly(vinyl butyral) with residual hydroxyl in any of the ranges given in addition to any of the ranges given for plasticizer, where appropriate, to form many permutations that are within the scope of the present invention but that would be cumbersome to list.

Any figure reference numbers given within the abstract or any claims are for illustrative purposes only and should not be construed to limit the claimed invention to any one particular embodiment shown in any figure.

Figures are not drawn to scale unless otherwise indicated.

Each reference, including journal articles, patents, applications, and books, referred to herein is hereby incorporated by reference in its entirety.

We claim:

1. A method of manufacturing a multiple layer glazing panel, comprising the steps:

providing a thermoplastic polymer pellet comprising plasticized poly(vinyl butyral) and an antiblocking agent;
heating said pellet to form a melt; and,
extruding said melt to form a polymer layer, wherein said polymer layer is disposed between two glazing panes, wherein said antiblocking agent is a fatty acid amide having the general formula:

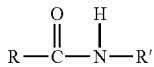

wherein R defines an anti-blocking segment comprising a hydrocarbon chain having about 12 to about 40 carbon atoms, and R' defines H or a hydrocarbon chain having 1 to about 40 carbon atoms.

2. The method of claim 1, wherein said fatty acid amide is selected from the group consisting of erucamide, behenamide, oleyl palmitamide, stearyl erucamide, erucyl stearamide, hydroxystearamide, oleic acid diethanolamide, stearic acid diethanolamide, poly(ethylene glycol) oleic amide, octadecanamide, and mixtures of the foregoing.

3. The method of claim 1, wherein said fatty acid amide is a mono-amide.

4. The method of claim 1, wherein said fatty acid amide is a secondary mono-amide.

5. The method of claim 1, wherein said fatty acid amide is 0.001 to 6.0 weight percent of said pellet.

6. The method of claim 1, wherein said fatty acid amide is 0.01 to 0.6 weight percent of said pellet.

7. The method of claim 1, wherein said fatty acid amide is 0.1 to 0.3 weight percent of said pellet.

8. The method of claim 1, wherein said fatty acid amide is N-oleyl palmitamide.

9. The method of claim 8, wherein said fatty acid amide is 0.001 to 6.0 weight percent of said pellet.

10. The method of claim 8, wherein said fatty acid amide is 0.01 to 0.6 weight percent of said pellet.

11. The method of claim 8, wherein said fatty acid amide is 0.1 to 0.3 weight percent of said pellet.

12. A multiple layer glazing panel produced by the method comprising the steps:

providing a thermoplastic polymer pellet comprising plasticized poly(vinyl butyral) and an antiblocking agent;
heating said pellet to form a melt; and,
extruding said melt to form a polymer layer, wherein said polymer layer is disposed between two glazing panes to form said multiple layer glazing panel, wherein said antiblocking agent is a fatty acid amide having the general formula:

wherein R defines an anti-blocking segment comprising a hydrocarbon chain having about 12 to about 40 carbon atoms, and R' defines H or a hydrocarbon chain having 1 to about 40 carbon atoms.

13. The panel of claim 12, wherein said fatty acid amide is selected from the group consisting of erucamide, behenamide, oleyl palmitamide, stearyl erucamide, erucyl stearamide, hydroxystearamide, oleic acid diethanolamide, stearic acid diethanolamide, poly(ethylene glycol)oleic amide, octadecanamide, and mixtures of the foregoing.

14. The panel of claim 12, wherein said fatty acid amide is a mono-amide.

15. The panel of claim 12, wherein said fatty acid amide is a secondary mono-amide.

16. The panel of claim 12, wherein said fatty acid amide is 0.001 to 6.0 weight percent of said pellet.

17. The panel of claim 12, wherein said fatty acid amide is 0.01 to 0.6 weight percent of said pellet.

18. The panel of claim 12, wherein said fatty acid amide is 0.1 to 0.3 weight percent of said pellet.

19. The panel of claim 12, wherein said fatty acid amide is N-oleyl palmitamide.

20. The panel of claim 19, wherein said fatty acid amide is 0.001 to 6.0 weight percent of said pellet.

21. The panel of claim 19, wherein said fatty acid amide is 0.01 to 0.6 weight percent of said pellet.

22. The panel of claim 19, wherein said fatty acid amide is 0.1 to 0.3 weight percent of said pellet.

* * * * *